United States Patent [19]
Mooney et al.

[11] 3,857,086
[45] Dec. 24, 1974

[54] PROCESS FOR ESTABLISHING IGNITION TIMING OF A RECIPROCATING INTERNAL COMBUSTION ENGINE

[75] Inventors: Robert A. Mooney, Orchard Lake; John M. Bell, Dearborn, both of Mich.

[73] Assignee: Ford Motor Company, Dearborn, Mich.

[22] Filed: Dec. 7, 1972

[21] Appl. No.: 312,996

Related U.S. Application Data

[63] Continuation of Ser. No. 124,080, March 15, 1971, abandoned.

[52] U.S. Cl. .................................. 324/16 R, 73/118
[51] Int. Cl. ............................................. F02p 17/00
[58] Field of Search ............ 324/15, 16, 17, 18, 19; 73/116–119; 33/180 AT, 181 AT

[56] References Cited
UNITED STATES PATENTS
2,263,859   11/1941   Eldredge .......................... 324/16 T

*Primary Examiner*—Michael J. Lynch
*Attorney, Agent, or Firm*—Robert A. Benziger; Keith L. Zerschling

[57] ABSTRACT

A magnetic transducer located in a socket in a timing plate attached to a reciprocating engine generates an electrical signal when a groove in a crankshaft vibration damper rotates past the transducer. The signal is compared with a signal taken from a spark plug lead or the ignition coil high tension lead to determine dynamic ignition timing of the engine.

12 Claims, 2 Drawing Figures

PROCESS FOR ESTABLISHING IGNITION TIMING OF A RECIPROCATING INTERNAL COMBUSTION ENGINE

This application is a continuation of our copending commonly assigned patent application Ser. No. 124,080 filed 3,15,71 titled "Process for Establishing The Ignition Timing of an Internal Combustion Engine" which is now abandoned.

SUMMARY OF THE INVENTION

This application relates to the subject matter of concurrently filed U.S. Pat. application Bell et al. Ser. No. 124,082, entitled "Tool For Establishing Ignition Timing of a Reciprocating Internal Combustion Engine," the entire disclosure of which is incorporated herein by this reference, now U.S. Letters Pat. No. 3,691,641.

Ignition timing of reciprocating internal combustion engines has considerable influence on vehicle emission levels and extensive research and development has been conducted in recent years to determine optimum timing for all phases of engine operation. The effectiveness of optimum timing of course depends on initial timing settings, however, and prior art techniques of setting initial timing have been found to introduce variations that have a significant effect on emissions.

In typical prior art techniques of setting initial timing, a crankshaft damper or pulley mounted on the projecting portion of the engine crankshaft has at least one scribed mark on its exterior surface that coincides with a timing pointer mounted on the engine block when the number one piston is at its top dead center (TDC) position. Ignition timing is set dynamically at a predetermined engine speed with a strobe light synchronized with the ignition pulse for the number one cylinder. The strobe light is aimed at the timing pointer and its impulses provide a visual indication of the relationship between the pointer and the scribed mark on the crankshaft damper or pulley. Rotating the ignition distributor housing adjusts the timing to the desired value.

A source of considerable error in ignition timing has been the assumption that manufacturing tolerances relating to the timing pointer position do not produce significant timing variations. It has been discovered, however, that variations in the position of the pointer permitted by tolerances and assembly practices can shift the entire timing curve by several degrees. Additionally, numerous accessories on the front of the engine introduce parallax errors during strobe light operation, and the proximity of the rotating engine fan plus moving accessory drive belts induces potential human errors.

This invention provides a process for accurately establishing the dynamic ignition timing of a reciprocating engine in a manner that virtually eliminates operator error and the manufacturing tolerance stackups of prior art systems. The process can be carried out safely and efficiently and it provides mass produced engines having greatly improved exhaust emission properties. For a reciprocating internal combustion engine having an engine crankshaft mounted rotatably in an engine block and having at lease one piston connected to the crankshaft for reciprocating movement in the block, and an ignition mechanism for applying an ignition pulse to the combustion chamber of the piston, the process comprises positioning a pickup device on the engine to produce an electrical signal representative of the position of the piston, and comparing a signal from the pickup device with a signal representative of the ignition pulse. The relative timing of these signals represents the advance or retard setting of the ignition system.

A convenient technique for producing a signal representative of the piston position comprises installing a pickup device in a timing plate mounted accurately on the engine block adjacent a portion of the engine crankshaft. The pickup device electromagnetically generates an electrical signal when a groove in a ferromagnetic component rotating with the crankshaft passes nearby. Such a groove can be included in the circumference of a conventional vibration damper mounted on the portion of the crankshaft projecting from the engine block.

The electrical signal from the magnetic transducer is applied to a comparator circuit of a computer that also receives an electrical signal representing an ignition pulse. A proximity clamp attached to an ignition lead conveniently generates the signal representing an ignition pulse.

Either electrical signal can be integrated to produce a measurement of the engine rotational speed, although conventional engine tachometers also can be used for this purpose. The signal representing an ignition pulse can be obtained from the high tension lead of the ignition coil if desired. This technique produces a signal representing the average of the ignition pulses to each cylinder, and thus improves overall ignition timing accuracy.

Ignition timing is adjusted usually by rotating the ignition distributor housing and the ignition contact points included therein relative to the engine block. With the engine operating at some predetermined speed, the distributor housing is rotated until ignition timing reaches the desired setting. The distributor housing then is fastened in place and the transducer and proximity clamp are removed. To eliminate an additional source of operator error, a power tool for fastening the distributor housing in place can be coupled to the comparator circuit of the computer so that the tool is operable only when engine speed and ignition timing are within a predetermined range. Distributor housing rotation usually is performed manually but can be done automatically by a mechanism that responds to the output of the computer.

A recorder can be coupled to the computer and the power tool to make a printed record of the ignition timing and engine RPM at the instant the power tool applies specific torque to a fastener clamping the distributor housing in place. The recorder can produce a decal containing this data that is applied to the engine to provide visual certification of proper engine timing. A record of proper timing also can be produced for use in overall quality control of ignition timing and overall certifications.

Overall timing accuracy hinges on accurately positioning the timing plate on the engine block. Timing plate position can be accomplished with the tool disclosed in the aforementioned Bell et al. patent application. Briefly, the procedure for using the tool comprises attaching the tool to the engine crankshaft, rotating the tool and crankshaft to a reference position, engaging a sliding pin on the tool with a socket in the timing plate when the crankshaft is in the reference position, and tightly fastening the timing plate to the engine block while the plate is engaged with the locating member.

The socket subsequently receives the magnetic transducer that produces an electrical signal from a groove in the vibration damper.

This procedure absorbs manufacturing tolerances essential to economical mass production and accurately positions the timing plate. Actual tests on 351 cubic inch V-8 engines using the tool indicate that the timing plate can be positioned with an accuracy of ± 0.49 ° at 99.8 percent confidence under production conditions.

A more efficient technique of positioning the timing plate comprises locating the timing plate on dowels fastened to the engine block. The dowels conveniently are fastened to the front of the engine block near the projecting portion of the crankshaft. For maximum accuracy, the dowels are spaced on opposite sides of the crankshaft vertical centerline and are as far apart as permitted by engine block dimensions. Corresponding holes in the timing plate accept the dowels and the timing plate is fastened to the engine block by threaded fasteners or other conventional techniques. A socket included in the timing plate receives the magnetic transducer that generates an electrical signal from a groove in the vibration damper. Actual tests on the 351 cubic inch engine using this procedure with 2 positioning dowels located about 11 inches apart indicate timing plate position accuracy of ± 0.62 degrees at 99.8 percent confidence.

Alternatively, a socket for the transducer can be cast into the engine block or included on some other engine component adjacent an engine member capable of producing a signal representative of piston position. In addition to the engine crankshaft, the camshaft, a connecting rod, piston, or valve train component can serve as the engine member.

DETAILED DESCRIPTION

Figure 1:
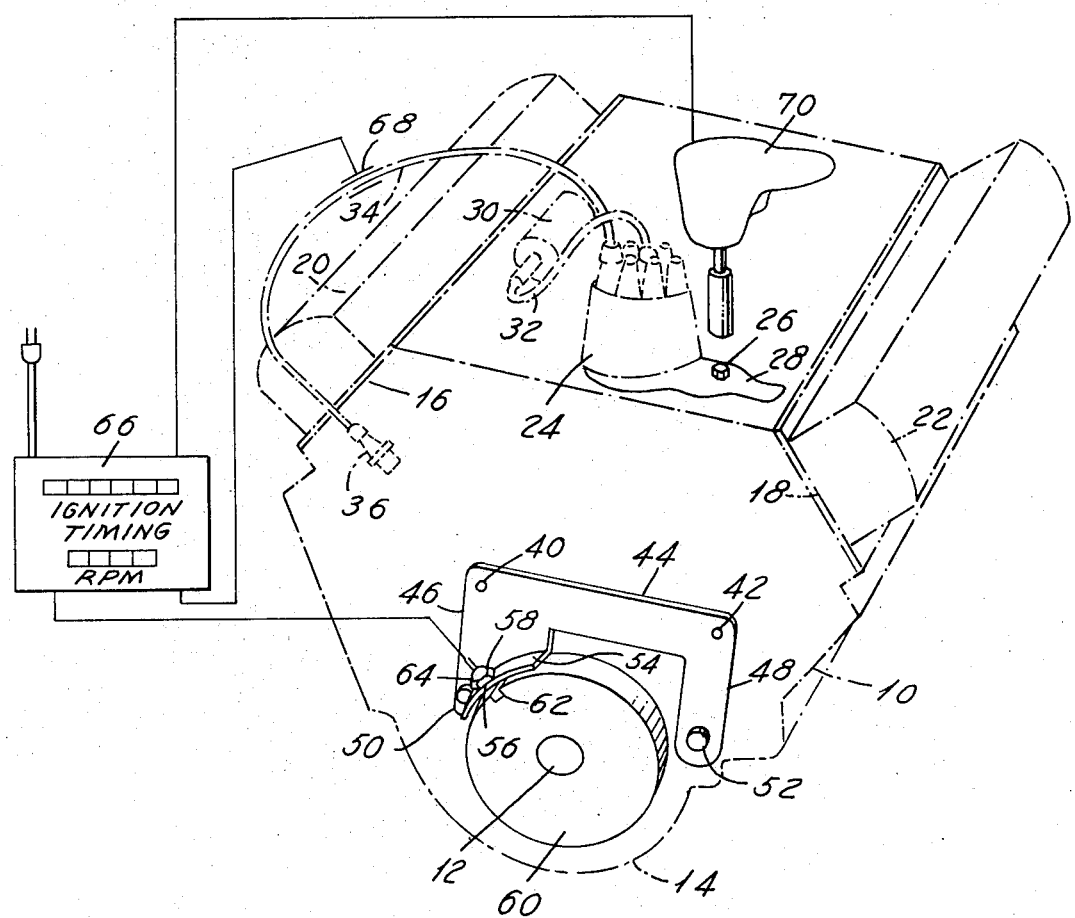
FIG. 1 of the drawing shows the front of an engine having a timing plate positioned thereon by spaced dowels so a socket included in the timing plate is adjacent the vibration damper. Also shown is a magnetic transducer positioned in the socket to sense crankshaft position, a clamp used to sense an ignition pulse to a reference cylinder, the computer for comparing crankshaft position with the ignition pulse and a power tool for fixing ignition timing at the desired value.

Referring to FIG. 1 of the drawing, the block 10 of an internal combustion engine, in this case a reciprocating piston V-8 type internal combustion engine, has an engine crankshaft 12 mounted rotatably therein. Eight pistons are attached in the conventional manner to crankshaft 12 for reciprocating movement in block 10. The lower side of block 10 is enclosed by an engine oil pan 14. Cylinder heads 16 and 18 are fastened on the block and are surmounted by conventional valve covers 20 and 22.

An ignition distributor housing assembly 24 is mounted on top of the engine so that it can be rotated slightly relative to the engine block. Housing assembly 24 contains the conventional ignition timing points (not shown). A threaded fastener 26 extends through a clamping plate 28 fastened to distributor housing 24. Fastener 26 threadably engages the engine block and can be tightened to a specified torque to fix the distributor housing assembly in place. An ignition coil 30 is mounted on the engine and has a high tension lead 32 connecting it to the input terminal of distributor housing assembly 24. A spark plug lead 34 connects distributor housing assembly 24 with the spark plug 36 for the number one engine cylinder; the spark plug leads for the other cylinders have been omitted from the drawing for clarity.

A pair of dowels 40 and 42 project from the front of engine block 10. Dowels 40 and 42 are located on opposite sides of the vertical centerline of engine crankshaft 12 and are spaced a considerable distance apart. A U-shaped timing plate 44 has openings near each end of its base that fit onto dowels 40 and 42. Legs 46 and 48 of the timing plate project downward and threaded fasteners 50 and 52 extend through holes in the legs to fasten the timing plate to the engine block. Leg 46 has a portion 54 extending outwardly from the engine block and portion 54 has a boss 56 attached thereto to define a socket 58. A conventional vibration damper 60 is attached to the projecting portion of engine crankshaft 12. Vibration damper 60 is made of a ferromagnetic material and has a small groove 62 located on its circumference.

A magnetic transducer 64 is located in socket 58 where the transducer will generate an electrical signal whenever engine rotation moves groove 62 past the transducer. Transducer 64 is connected to one input of a computer 66 and a clamp 68 fitting around ignition cable 34 serves as another input to the computer. Computer 66 includes an electronic comparator circuit for comparing the time interval between the signal from transducer 64 and the signal from clamp 68. Comparator output is displayed on the face of the computer usually in the form of a digital output showing the degrees and minutes of engine timing advance or retard from the top dead center position. The computer also includes a circuit for determining the rotational speed of the engine which is displayed digitally on the front of the computer. Typical electronic circuits for performing these functions are known to the art. An output terminal of the computer is connected to a power tool 70.

Engine timing is set in the following manner. With the engine rotating within some predetermined speed range, typically about 650–850 RPM, the equipment operator rotates distributor housing 24 until the timing advance or retard as displayed on the face of computer 66 falls within a predetermined range. Power tool 70 is engaged with threaded fastener 26 but will not operate until both ignition timing and engine RPM are within the predetermined ranges. When this occurs, computer 66 applies power to tool 70 which tightens threaded fastener 26 and thereby prevents further rotation of ignition distributor housing 24. Transducer 64, clamp 68, and power tool 70 then are removed from the engine.

Clamp 68 can be applied to high tension lead 32 between ignition coil 30 and ignition distributor housing assembly 24. Using this position of the clamp provides to the computer a signal representing the average ignition timing of each cylinder of the engine which thereby improves overall timing accuracy. A recorder can be coupled to computer 66 and power tool 70 to print out the ignition timing and engine RPM readings at the instant the power tool reaches its stall torque while tightening fastener 26.

After ignition timing has been set for one speed range, the mechanism can be used to check ignition timing at other speed ranges. Instead of manually rotating the distributor housing assembly to adjust ignition timing to the proper range, a mechanism coupled to computer 66 can perform this operation automatically. Tool 70 and the mechanism for automatically setting the distributor housing assembly can be operated by pneumatic, hydraulic, or electric power as desired.

Figure 2:
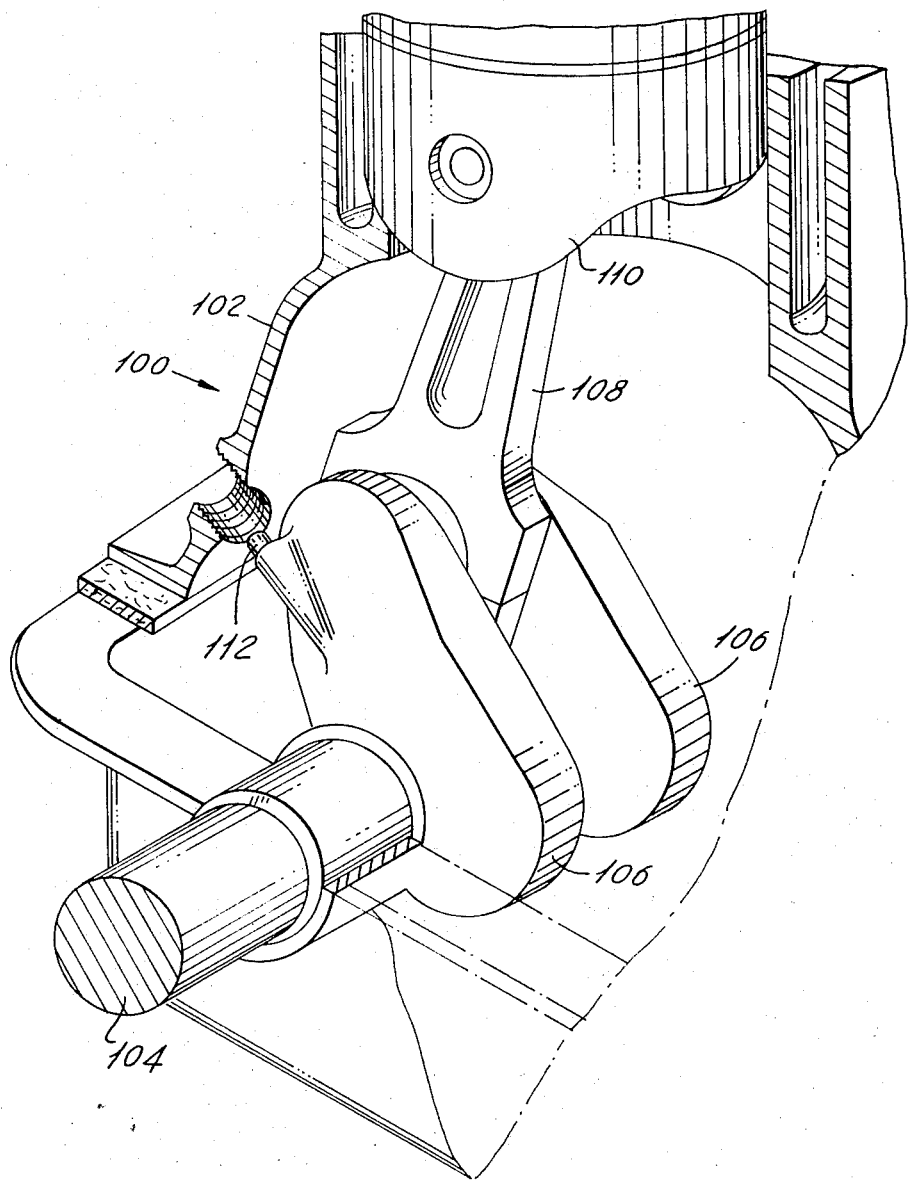
FIG. 2 of the drawing shows a broken away elevation of an internal combustion engine having the transducer receiving socket formed in the engine block.

Referring now to FIG. 2, a partially broken away elevational view of an internal combustion engine is illustrated to show an alternative location for the transducer receiving socket illustrated and described with reference to FIG. 1. In this instance, a socket 100 is formed in the engine block 102 and may be so formed during the casting process of forming the block. A crankshaft 104 is received within the engine block 102 for rotary movement with respect thereto and includes a plurality of pairs of crank arms 106 which are connected to piston rods 108 for reciprocating a piston 110 which is received in a cylinder provided therefor. As such structure is generally well known further description is not seen to be necessary.

Socket 100 is provided in the block 102 in the plane of rotation of one of the crank arms 106 at a point in the engine block which is remote from the center of rotation of the crank arms 106. This coincides with the centerline of crank shaft 104.

By locating socket 100 at a point which is linearly remote from the centerline of crankshaft 104, the placement of socket 100 in rectilinear coordinate system can be readily accomplished within the normal manufacturing tolerances of an engine block and will provide an angular position of that socket relative to the centerline of the crankshaft which will not deviate significantly, for example not more than 1°, for socket position variation within normal manufacturing tolerances. The provision of a ferromagnetic indicia means on a selected crank arm 106 of crankshaft 104 or upon another rotary member which is rotated by, or in synchronism with, rotation of crankshaft 104 can readily be achieved at a minimum of cost and with high reliability since the same factors that contribute to the high angular accuracy of the socket location, (I.e., the linear remoteness of that location from the centerline of the crankshaft 104) will also render the location of the indicia means angularly accurate with respect to the centerline of crankshaft 104.

Thus this invention provides a process for establishing a fixed reference to accurately establishing and checking the ignition timing of a reciprocating engine accurately, efficiently, and at a rate compatible with conventional mass production techniques. The resulting engines take full advantage of the significant developments concerning the improved exhaust emissions resulting from ignition timing.

We claim:

1. A process for reliably and repeatably establishing the ignition timing of a reciprocating internal combustion engine having an engine crankshaft mounted rotatably in an engine block, at least one piston connected to said crankshaft for reciprocating movement in said block, and an ignition mechanism for applying an ignition pulse to the combustion chamber for said piston comprising:

permanently positioning a timing plate having a socket therein on the engine block by locating the timing plate at at least two points of the engine block, said timing plate being fastened to the engine block and remaining fastened to the engine block during normal engine use, said socket being located adjacent a member that is rotated by the engine crankshaft and has a means representative of the position of a piston, at least one of the two locating points being more remote from the rotated member than is the socket, removably positioning a pickup device in said socket to produce an electrical signal representative of the position of said piston, whereby the socket defines a permanent reference point available for periodic repositioning of a pickup device to accurately reproduce the established ignition timing, and comparing the signal from said pickup device with a signal representative of said ignition pulse to establish ignition timing.

2. The process of claim 1 comprising rotating an ignition distributor housing to adjust ignition timing and utilizing the signal from the pickup device and the signal representative of the ignition pulse to control the application of power to a power tool that prevents further rotation of the distributor housing.

3. The process of claim 1 in which determining the signal representative of the ignition pulse comprises attaching a clamp to an ignition spark lead, and electrically producing a signal from said clamp when an ignition pulse passes through said spark plug lead.

4. The process of claim 3 in which the step of attaching the clamp to an ignition spark lead comprises attaching the clamp to the high tension output lead of the ignition coil of the engine.

5. The process of claim 1 comprising forming said rotating member of ferromagnetic material and forming a groove in said rotating member, said groove being representative of the position of said piston, and magnetically sensing when said groove passes said pickup device to produce a signal representative of the position of said piston.

6. The process of claim 5 in which determining the signal representative of the ignition pulse comprises attaching a clamp to an ignition spark lead, and electrically producing a signal from said clamp when an ignition pulse passes through said spark plug lead.

7. The process of claim 6 in which the step of positioning the timing plate comprises sliding the timing plate onto at least two dowels projecting from the engine block, said dowels being on opposite sides of the vertical centerline of the engine.

8. The process of claim 7 in which the step of attaching the clamp to an ignition spark lead comprises attaching the clamp to the high tension output lead of the ignition coil of the engine.

9. The process of claim 8 comprising rotating an ignition distributor housing to adjust ignition timing and utilizing the signal from the pickup device and the signal representative of the ignition pulse to control the application of power to a power tool that prevents further rotation of the distributor housing.

10. A process for establishing the ignition timing of an internal combustion engine having an engine crankshaft rotatably mounted in an engine block, means defining at least a portion of a variable volume combustion chamber connected to the engine crankshaft and an ignition mechanism for applying an ignition pulse to the combustion chamber comprising:

defining at least one point on the engine block in proximity to a member rotated by the engine crankshaft and remote from the center of rotation of the rotatable member;

providing the rotatable member with indicia means representative of the position of the means defining the portion of the variable volume combustion chamber;

providing said defined point with means forming a permanently positioned socket in a wall of the engine block adjacent the rotatable member, said socket communicating the interior of the engine block adjacent the rotated member with the exterior of the engine block;

said defined point being selected to be as remote as possible from the center of rotation of the rotatable member while maintaining the adjacent spacing between the socket and the rotatable member whereby the socket defines, with a high degree of accuracy, a permanent reference point for the rotatable member indicia means;

removably inserting a pickup device in said socket to produce an electrical signal representative of the position of said indicia means; and comparing said pickup device signal with a signal representative of the ignition pulse to establish ignition timing.

11. The process of claim 10 wherein said defined point is sufficiently remote from the centerline of the crankshaft that the angular variation in the point relative to the centerline of the crankshaft occasioned by normal manufacturing tolerances is less than about 1°.

12. The process of claim 10 wherein the step of providing said defined point with means forming a socket comprises the step of permanently positioning a timing plate having a socket therein on the engine block by locating a point of the timing plate at said defined point, said timing plate being fastened to the engine block and remaining fastened to the engine block during normal engine use, said socket being located adjacent said rotatable members.

* * * * *